(12) United States Patent
Asaro et al.

(10) Patent No.: US 8,202,350 B2
(45) Date of Patent: Jun. 19, 2012

(54) METHOD AND APPARATUS FOR GAS REMOVAL

(75) Inventors: Marianna F. Asaro, Belmont, CA (US); Yigal Blum, San Jose, CA (US)

(73) Assignee: SRI International, Menlo Park, CA (US)

( * ) Notice: Subject to any disclaimer, the term of this patent is extended or adjusted under 35 U.S.C. 154(b) by 425 days.

(21) Appl. No.: 12/491,889

(22) Filed: Jun. 25, 2009

(65) Prior Publication Data

US 2010/0326272 A1 Dec. 30, 2010

(51) Int. Cl.
*B01D 53/04* (2006.01)
(52) U.S. Cl. ............ 95/96; 95/148; 96/144; 96/154
(58) Field of Classification Search ........ 95/90, 96, 95/114, 115, 148; 96/121, 144, 154
See application file for complete search history.

(56) References Cited

U.S. PATENT DOCUMENTS

| | | | | |
|---|---|---|---|---|
| 2,038,071 A | * | 4/1936 | Wilhelm | 96/118 |
| 3,675,394 A | * | 7/1972 | Sterrett | 96/133 |
| 4,386,947 A | * | 6/1983 | Mizuno et al. | 96/137 |
| 4,917,862 A | * | 4/1990 | Kraw et al. | 422/4 |
| 5,260,035 A | * | 11/1993 | Lachman et al. | 422/180 |
| 5,658,372 A | | 8/1997 | Gadkaree | |
| 5,750,026 A | | 5/1998 | Gadkaree | |
| 2006/0101999 A1 | * | 5/2006 | Steins | 96/134 |
| 2006/0165574 A1 | | 7/2006 | Sayari | |
| 2008/0148936 A1 | | 6/2008 | Baksh | |
| 2008/0314245 A1 | | 12/2008 | Hershkowitz | |

FOREIGN PATENT DOCUMENTS

WO WO-02/087729 A1 11/2002

OTHER PUBLICATIONS

International Search Report and Written Opinion for PCT/US2009/049940; Mar. 2, 2010, 11 pages.

* cited by examiner

*Primary Examiner* — Frank Lawrence, Jr.

(57) ABSTRACT

Aspects of the invention include a method and apparatus for reversibly sorbing a target gas. In one embodiment, an apparatus for reversibly sorbing a target gas is disclosed. The apparatus includes an inlet, a multi-channel monolith coupled to the inlet, the multi-channel monolith including a plurality of channels, each one of the plurality of channels includes one or more walls, wherein at least one of the one or more walls of at least one of the plurality of channels is porous and wherein one or more of the plurality of channels contain a sorbent and an outlet coupled to the multi-channel monolith.

36 Claims, 6 Drawing Sheets

EXIT GAS

METHOD AND APPARATUS FOR GAS REMOVAL

FIELD OF THE INVENTION

The present invention relates generally to gas removal and more specifically to a method and apparatus for reversibly sorbing a target gas.

BACKGROUND OF THE DISCLOSURE

Gas separation technology is needed in various industries. One gas separation of particular interest is commercial scale carbon dioxide ($CO_2$) gas separation. Currently, there are two methods of $CO_2$ gas separation in commercial use.

One method is cryogenics that involves cooling the entire gas mass to be separated, whereupon the $CO_2$ gas preferentially condenses and is collected. Cryogenics is considered prohibitively expensive, due to the high energy consumption involved in cooling the large mass of gas, with some potential for economic use at very high $CO_2$ gas concentrations of up to 75%. Most effluent streams contain 10-40% $CO_2$ gas, and therefore cryogenics is not considered economically viable for $CO_2$ gas separation.

The second method of $CO_2$ gas separation in commercial use is amine scrubbing, which involves exposing the gas mass to be separated to a solution of an amine. However, amine scrubbing is currently used only on a small commercial scale and is poorly scalable to the large scales needed for $CO_2$ gas capture from, for example, power plant emissions; because of its high energy consumption, low capacity, and high capital and operating costs.

Other methods of $CO_2$ gas separation are in development but also suffer from the deficiencies associated with the cryogenics and the amine scrubbing methodologies noted above. That is, other methodologies in development, such as solvation as with methanol in the Rectisol process for acid gas removal, and membrane separators suffer from low economic viability due to high energy consumption, poor selectivity, low capacity and poor scalability to large commercial scales.

SUMMARY OF THE INVENTION

In one embodiment, the present invention relates generally to an apparatus for reversibly sorbing a target gas. The apparatus comprises an inlet, a multi-channel monolith coupled to said inlet, said multi-channel monolith comprising a plurality of channels, each one of said plurality of channels comprises one or more walls, wherein at least one of said one or more walls of at least one of said plurality of channels is porous and wherein one or more of said plurality of channels contain a sorbent and an outlet coupled to said multi-channel monolith.

In one embodiment, the present invention is directed towards a method for reversibly sorbing a target gas. The method comprises providing a multi-channel monolith comprising a plurality of channels, each one of said plurality of channels comprises one or more walls, wherein at least one of said one or more walls of at least one of said plurality of channels is porous and wherein one or more of said plurality of channels contain a sorbent, passing a gas mixture through said multi-channel monolith to reversibly remove a target gas from said gas mixture via a sorption process and applying a desorption process to remove said target gas from said sorbent.

In one embodiment, the present invention is directed towards a second embodiment of an apparatus for reversibly sorbing a target gas. The apparatus comprises an inlet, a multi-channel monolith coupled to said inlet, said multi-channel monolith comprising a plurality of channels, wherein each one of said plurality of channels comprises one or more walls and wherein all of said plurality of channels contain a sorbent and an outlet coupled to said multi-channel monolith.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Aspects of the present invention are directed towards a method and apparatus for gas separation. For example, the methods and apparatuses disclosed herein may be used for reversible sorption of specific gases, such as carbon dioxide ($CO_2$), from mixtures of gases. Sorbing may include either adsorption or absorption, as discussed below. Although $CO_2$ is used as an example, it should be noted that the methods and apparatuses disclosed herein may be used for other gases and are not limited only to $CO_2$.

Figure 1:
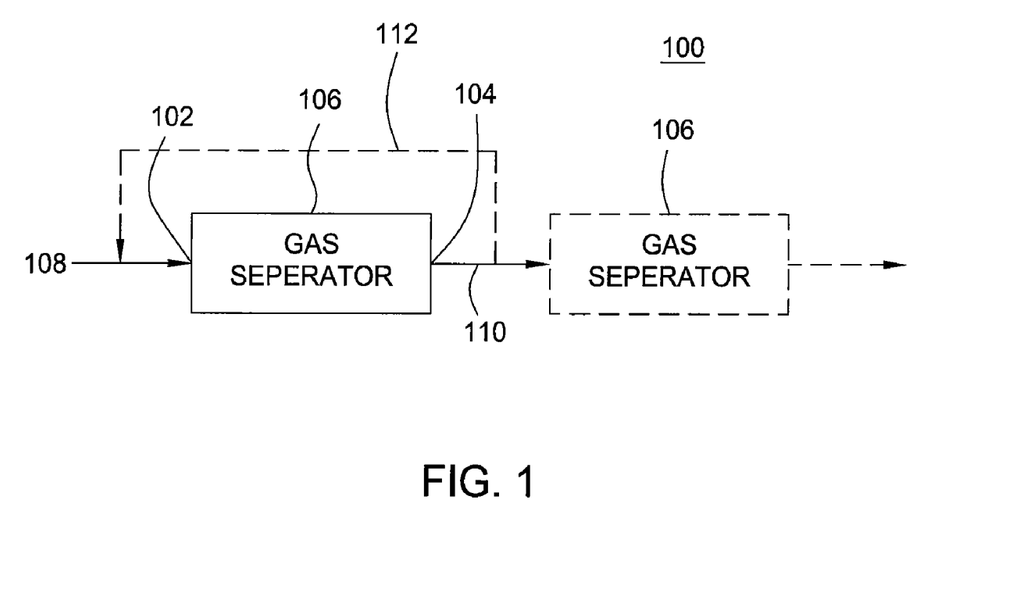
FIG. 1 depicts a block diagram of a system utilizing an apparatus for gas removal disclosed herein.

FIG. 1 illustrates one embodiment of an apparatus 106, e.g. a gas separator 106, in a system 100 for gas separation in accordance with the present invention. The system 100 includes a gas mixture feed 108. The gas mixture feed 108 is fed through the apparatus 106 via an inlet 102 coupled to the apparatus 106. A target gas (e.g., $CO_2$) may be captured within the apparatus 106. The gas mixture less a quantity of the target gas may exit the apparatus 106 via an outlet 104 coupled to the apparatus 106 as a second gas stream 110.

In one embodiment, a stepwise sorption and desorption process may be used to remove the target gas from the feed 108 and then from the apparatus 106, respectively. This process may be repeated, or cycled, using two beds that alternate in sorption and desorption modes, to continuously remove target gas from the gas mixture feed 108.

In another embodiment, the process may be used for recycle, to further decrease the amount of target gas in the exit stream 108. For example, the gas mixture less a quantity of the target gas exiting via the outlet 104 may be recycled back to the inlet 102 via an optional line 112 or may be fed through a series of optional apparatuses 106 illustrated by dashed lines in FIG. 1. The cyclical sorption desorption process is discussed in further detail below. It should be noted that other pieces of equipment not shown may be included in system 100 based on the embodiments discussed below, such as for example, heaters, coolers, reactors, pumps, valves and the like.

Figure 2:
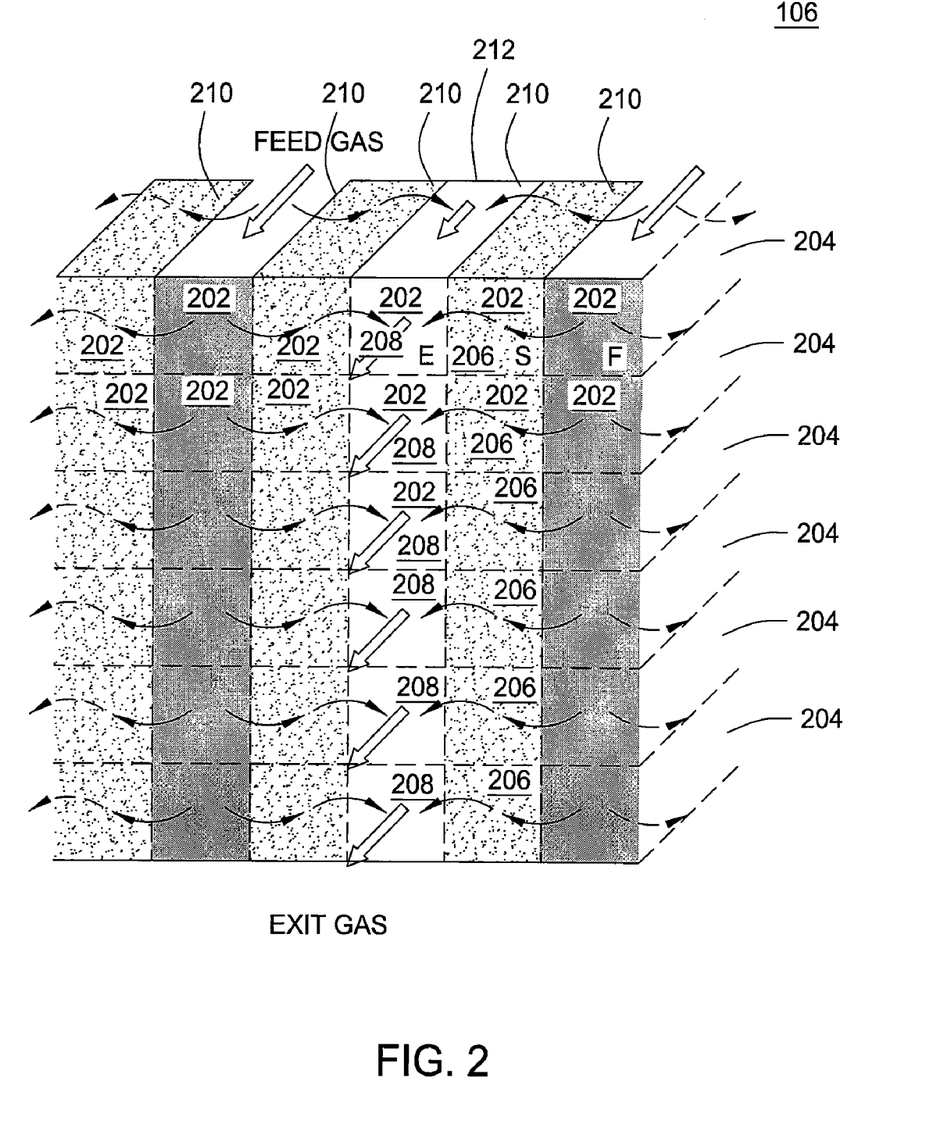
FIG. 2 depicts one embodiment of a multi-channel monolith.

In one embodiment, the apparatus 106 is a multi-channeled monolith. FIG. 2 illustrates an example of the apparatus 106 as a multi-channeled monolith. Hereinafter, the apparatus 106 and the multi-channeled monolith 106 may be used interchangeably.

In one embodiment, the multi-channeled monolith 106 may be extruded as a single piece that includes a plurality of channels 202. The multi-channel monolith 106 may be extruded from a ceramic, an inorganic metallic material, an organic material or glass. Some examples include alumina, silicon carbide, mullite, and cordierite.

The type of material used may depend on the design requirements. For example, ceramics with high thermal conductivity may be used when the heat transfer duty is high. In another embodiment, metals may be used when operating at very high pressures.

In any case, each one of the plurality of channels 202 is contiguous and adjacent to one another as a result of the single extrusion that forms the multi-channel monolith 106. That is, there are substantially no voids or spaces between each one of the channels 202. Said another way, each of the plurality of channels 202 shares common walls 210.

Some of the plurality of channels 202 may be labeled with an "F" for feed channels 204. Those channels 202 that contain sorbent, represented by hatching and labeled with an "S", are sorbent channels 206. The sorbent channels 206 have an interior volume that may be completely filled with sorbent or may be partially filled as to leave a portion of each one of the sorbent channels 206 unfilled. The remaining channels 202 labeled with an "E" are exit channels 208.

Depending on the configuration of the system 100 and how the gas separation is performed, one or more of the plurality of channels 202 may have an end capped. For example, in FIG. 2, an end of feed channel 204 is capped as illustrated with the darkly shaded openings. The exit channels 208 may be capped on an opposite end as illustrated with a solid line 212, relative to the ends of feed channels 204 that are capped. In other words, if the feed channels 204 are capped on a left side of the multi-channeled monolith 106, then the exit channels 208 may be capped on a right side of the multi-channeled monolith 106; or if the feed channels 204 are capped on a top side of the multi-channeled monolith 106, then the exit channels 208 may be capped on a bottom side of the multi-channeled monolith 106. In one embodiment, the sorbent channels 206 may be capped on both ends.

Thus, in the example configuration illustrated in FIG. 2, the gas mixture feed 108 may enter the multi-channeled monolith 106 via the feed channels 204. Subsequently, the gas mixture feed 108 is forced through one or more walls 210 of the feed channels 204 and through a torturous path within the sorbent channels 206. One or more of the walls 210 are porous. For example, as illustrated in FIG. 2, all of the walls 210 may be porous. In another embodiment, some of the walls 210 may be porous and some of the walls 210 may be non-porous, as discussed below.

Within the sorbent channels 206 a target gas is reversibly captured by the sorbent. That is, the target gas is captured and subsequently may be removed from the sorbent via a desorption process, as discussed below. Subsequently, the second gas stream 110 having a quantity of the target gas removed is forced through the one or more walls 210 of the sorbent channels 206 and forced into the exit channels 208. The cross flow path of the gas is illustrated by arrows in FIG. 2.

The sorbent in the sorbent channels 206 may be an adsorbent or an absorbent. An adsorbent typically entrains a target gas more effectively than other gases, providing the capability to selectively remove the preferentially entrained gas from a mixture of less-well entrained gases. The difference between adsorbents and absorbents is that an absorbent, rather than entraining a gas, forms a chemical bond between the target gas and the absorbent.

The sorbent may be a porous solid or a porous gel material. In one embodiment, the sorbent may be a porous material to which the sorbing material has been applied. For example, if the sorbent is applied within or deposited on the walls 210 of the multi-channel monolith 106, then sorbent channels 206 may not be needed. That is, the porous walls 210 of the multi-channel monolith may themselves contain sorbing capacity, and thereby function as the sorbent. Alternatively, the porous solid or the porous gel material may be made of the sorbent material itself rather than being applied. As another example, the exit channels 208 and sorbent channels 206 may be one and the same, wherein the cross section of the exit channel 208 is partially filled with sorbent layered onto its walls 210, and the effluent gas exits this same channel through its empty internal space. This is illustrated by example in FIG. 3 below.

Sufficiently high porosity of the sorbent provides a correspondingly greater surface area for target gas capture, and thus, allows for a smaller footprint of the multi-channeled monolith 106. The selection of porosity and surface area for the sorbent may be based on the effect of the resultant void fraction on the anticipated pressure drop and tortuosity in the sorbent-containing multi-channel monolith 106. For example, sorbents with suitable porosity and surface area for $CO_2$ capture may include solid amine based sorbents, carbon or carbon composite based sorbents, zeolite based sorbents, aerogel based sorbents, and zinc or copper based sorbents for low temperature separation; and zirconates or carbonates for medium to high temperature separation; or such sorbing material supported on another material such as for example a porous refractory metal oxide.

As noted above, one or more of the walls 210 of the plurality of channels 202 may be porous to allow the gases to pass thorough the feed channels 204, the sorbent channels 206 and the exit channels 208. In one embodiment, the walls 210 may be approximately 0.04 millimeters (mm) to a few millimeters in thickness.

Although one configuration is illustrated in FIG. 2, it should be noted that other configurations are possible. Various other configurations are discussed in further detail below.

In one embodiment, the plurality of channels 202 is in a square shape. It should be noted that the plurality of channels 202 may be in any shape and not limited only to a square shape. For example, the plurality of channels 202 may be in a circular shape, an oval shape, a hexagonal shape and the like. Such shapes may be referred to as honeycomb monolith shapes. For example, the plurality of channels 202 may be arranged within the multi-channel monolith 106 in a honeycomb pattern.

The plurality of channels 202 may have a width in the approximate range of 1 millimeter (mm) to 1 centimeter (cm). The plurality of channels 202 may all have a same width or a common width. Alternatively, one or more of the plurality of channels 202 may have a different size width. For example, the sorbent channels 206 and exit channels 208 may have a first width and be smaller than the feed channels 204 having a second width.

Figure 3:
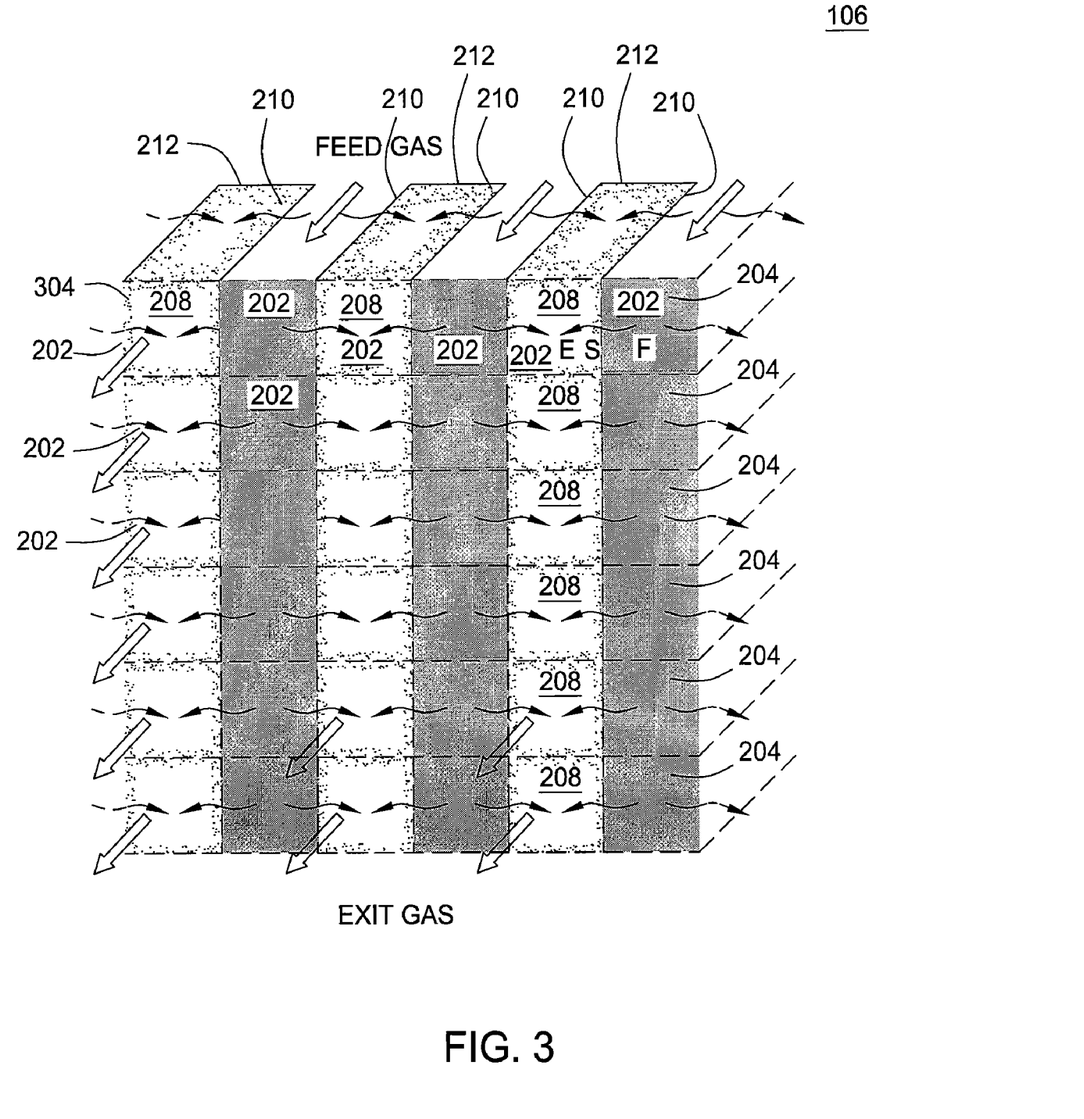
FIG. 3 depicts an alternate embodiment of a multi-channel monolith.

FIG. 3 illustrates another embodiment of the multi-channel monolith 106. The monolith 106 illustrated in FIG. 3 includes a plurality of channels 202. Some of the channels 202 serve as a plurality of feed channels 204 and some of the channels 202 serve as a plurality of exit channels 208. Similar to the monolith 106 illustrated in FIG. 2, one or more of the plurality of channels 202 may have an end capped. For example, in FIG. 3, an end of the feed channels 204 is capped as illustrated with the dark shaded openings. The exit channels 208 may be capped on an opposite end as illustrated with a solid line 212, relative to the end of the feed channels 204 that are capped. In addition, one or more of the walls 210 may be porous.

In the embodiment illustrated in FIG. 3, the monolith 106 does not have separate sorbent channels as illustrated in FIG. 2. That is, the sorbent channels 206 illustrated in FIG. 2 may be removed. Rather, a sorbent 304 may be applied within or deposited on the walls 210 of the exit channels 208, as discussed above. For example, as discussed above, the exit channels 208 and sorbent channels 206 may be one and the same, wherein the cross section of the exit channel 208 is partially filled with sorbent 304 layered onto its walls 210, and the effluent gas exits the same channel through its empty internal space.

It should be noted that the sorbent 304 may also be applied to the feed channels 204 rather than the exit channels 208. In one embodiment, the sorbent 304 may completely fill the exit channels 208.

Figure 4:
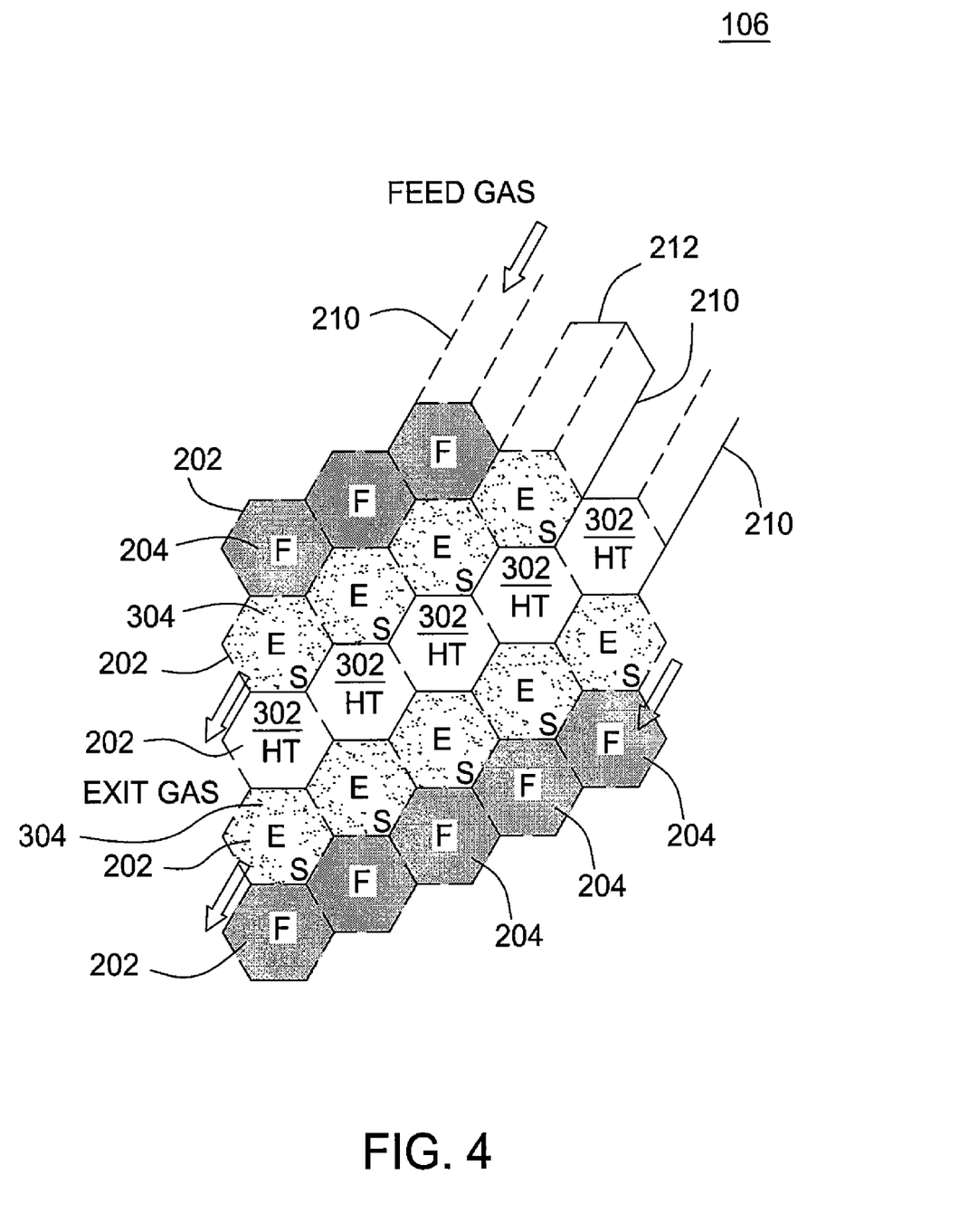
FIG. 4 depicts one embodiment of a multi-channel monolith that utilizes a heat transfer medium.

FIG. 4 illustrates another embodiment of the multi-channel monolith 106 having improved heat transfer. The multi-channel monolith 106 has a plurality of channels 202 similar to FIG. 2. As discussed above, the channels 202 may have a variety of different shapes. In the example embodiment illustrated by FIG. 4, the channels 202 have a hexagonal honeycomb shape. However, it should be noted that the configuration in FIG. 4 may equally apply to channels 202 having a square shape, a circular shape, an oval shape and the like.

The multi-channel monolith 106 of FIG. 4 includes feed channels 204 and exit channels 208. Similar to FIG. 3, FIG. 4 illustrates that a sorbent 304 may be applied within the walls 210 of the exit channels 208, as discussed above. Similar to FIGS. 2 and 3, the feed channels 204 may be capped on one end, illustrated by shading in FIG. 4, and the exit channels may be capped on an opposite end, illustrated by a solid line 212 in FIG. 4.

Moreover, FIG. 4 illustrates using one or more of the plurality of channels 202 as a heat transfer channel 302 labeled with "HT". A non-sorbent coating may be applied to the walls 210 of the heat transfer channels 302 to block lateral flow of gas to and from the heat transfer channels 302 to the other channels 202. During the target gas sorption process the sorbent 304 and the entering gas mixture may heat up as the target gas is adsorbed or absorbed to the sorbent 304. This may decrease the affinity of the sorbent 304 to the target gas.

During the target gas desorption process, the sorbent 304 and the exiting gas may cool as the target gas is desorbed. This cooling may inhibit the desorption process.

Using the heat transfer channels 302 in the multi-channel monolith 106 mitigates the above noted heat transfer problems. The heat transfer channels 302 may hold a heat transfer medium. The heat capacity and heat transfer rate of the heat transfer medium are selected so as to devote no more channels 202 to heat transfer beyond that number that allows maintenance of a target flux. This is to maintain maximum capacity of the multi-channel monolith 106. The heat transfer channels 302 allow for intimate exposure of sorbent containing channels (e.g. exit channels 208 in FIG. 3) to a high surface area of heat transfer medium through the walls 210 of the plurality of channels 202.

The heat transfer medium may be static or dynamic. For example, the heat transfer medium may be contained within the heat transfer channels 302 as a static heat transfer medium. As a result, the heat transfer channels 302 may be capped on both ends. The static heat transfer medium may be a fluid or a solid such as a metal.

Alternatively, a liquid may be used as a moving heat transfer medium through the heat transfer channels 302. As a result, the heat transfer channels 302 may be open on both ends to allow the heat transfer medium to flow axially through the channels 302. Some examples of suitable heat transfer media are water, mineral oil, DOWTHERM® produced by Dow Chemical Company of Midland, Mich., and the like.

It should be noted that although FIG. 4 illustrates the heat transfer channels 302 aligned in a single row, other configurations are possible. For example, the heat transfer channels 302 may be dispersed throughout the multi-channel monolith 106 or there may be multiple rows of heat transfer channels 302. In addition, the heat transfer channels 302 may be used in any configurations of the multi-channel monolith 106 disclosed herein.

Figure 5:
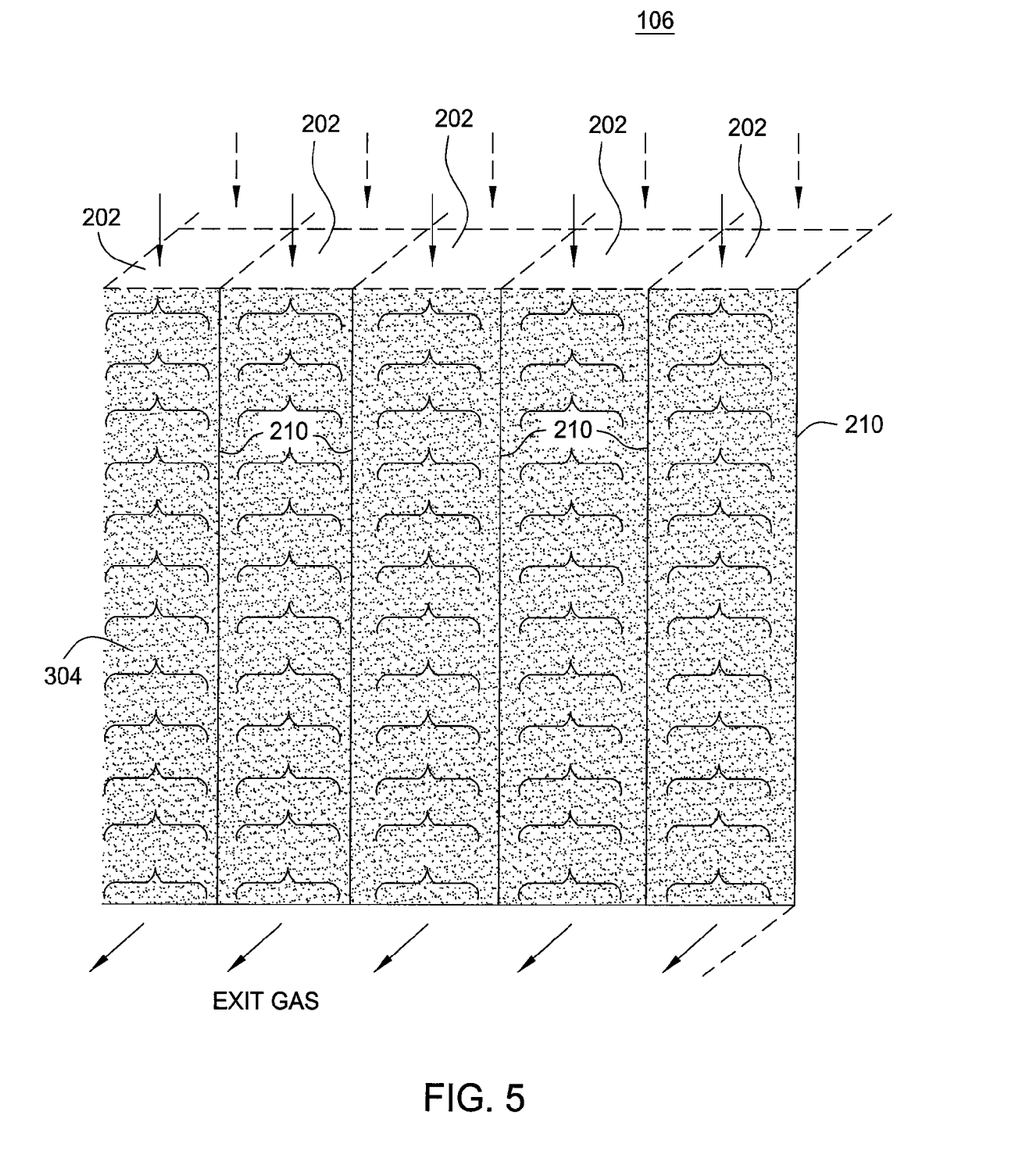
FIG. 5 depicts another embodiment of a multi-channel monolith.

FIG. 5 illustrates another embodiment of an apparatus or multi-channel monolith 106 for target gas separation. In the embodiment illustrated in FIG. 5, all of the plurality of channels 202 is open ended on each end of each one of the plurality of channels 202. Moreover, each one of the plurality of channels 202 comprises one or more walls 210 and contains a sorbent 304. In one embodiment, each one of the walls 210 of each one of the plurality of channels 202 may be coated such that each one of the walls 210 are non-porous.

In the embodiment illustrated in FIG. 5, the entering gas mixture is fed into the multi-channel monolith 106 through all of the plurality of channels 202 in the same direction. As the gas mixture flows through the sorbent 304, the target gas is captured or separated and the gas mixture less a quantity of the target gas exits the opposite end of the plurality of channels 202.

Alternatively, the walls 210 may not be coated such that one or more of the walls 210 up to all of the walls 210 are porous. This provides pressure equalization via the porous walls 210.

As a result, the above described embodiments of the apparatus for gas separation provide many improvements over the currently used systems and methods for gas separation. For example, the current invention provides a smaller footprint and a more scalable design than gas separation systems currently used by 100 fold. In addition, the multi-channel monolith described in the present invention may be stacked and or placed in series, while maintaining a smaller footprint.

Another advantage of the current invention is that the current multi-channel monolith design gas separator provides improved mass transfer. The closer proximity, and therefore more intimate contact, of gas and sorbent in the channels of the multi-channel monolith increases mass transfer rates at a given set of inlet and outlet pressures. Increased mass transfer rates provide a greater rate of gas separation per unit space per unit time, also known as flux, which decreases the process cost per unit of gas separated. In addition, the occurrence of cross talk during separation can be controlled or eliminated more easily using a multi-channel monolith.

Cross talk can occur in previous technologies because gas separated in an interstitial zone between lumens could pass back into the feed lumen, as well as into the intended exit lumen or space. This cross talk results in decreases in both flux and product purity, which decreases the process efficiency and increases process cost. The architecture and structure of the present invention allows better control of gas pressure and flow due to the rigid structure of the multi-channel monolith 106 and the individual control of pressure in the plurality of channels 202, and by the unique ability of the present invention to provide decreased surface area of walls 210 that are porous by coating like opposing faces of each channel 202 in alternate channels or in all channels.

Yet another advantage of the architecture and structure of the present invention is improved heat transfer. As discussed above, heat transfer channels 302 may be used to avoid the decrease of affinity of the sorbent 304 to the target gas during adsorption or absorption due to heating and to avoid the inhibition of desorption due to cooling of the sorbent 304 and the target gas. A final advantage is the use of improved sorbents over previous designs, including the ability of the present invention to tailor the porosity of the sorbent to the desired flux instead of having porosity limited by the properties of interstitial zone materials existing between gas flow zones as in the prior art.

The apparatus or multi-channel monolith 106 of the present invention may be utilized in various separator designs. For example, the multi-channel monolith 106 may be used in a design similar to that of plug flow reactors or continuous flow reactors. The multi-channel monolith 106 may be used stacked vertically and/or horizontally in a single separator train. Alternatively, the multi-channel monolith 106 may be used in multiple separator trains.

Moreover, the multi-channel monolith 106 of the present invention may be used within the scope of various general cyclic sorption and desorption process embodiments to reversibly bind and unbind the target gas from the sorbent. In one embodiment, the sorption and desorption may be accomplished using pressure swing with or without heat transfer media as needed. The pressure swing may be achieved using pressure gradients entirely above atmospheric pressure, or by inclusion of vacuum for the diminution of pressure during the desorption step. In another embodiment, the heat transfer media may be used to facilitate the sorption and desorption accomplished using temperature swing. In another embodiment, the sorption and desorption may be accomplished using a combination of pressure swing and temperature swing.

One type of pressure swing used may be a short path, rapid cycle pressure swing sorption separation. For example, cycles times may be in the range of 50 cycles per hour or significantly greater. One type of rapid cycle pressure swing adsorption is known as SHERPA® of SRI, International of Menlo Park, Calif.

In another embodiment, the sorption and desorption may be accomplished using electrochemical swing. The electrochemical swing may involve resistive heating or may involve a redox process wherein the nominal selectivity of the sorbent for the target gas may be cycled between essentially zero to extremely high values up to 100% by cycling an oxidation state of the sorbent.

In another embodiment, the sorption and desorption are accomplished using a combination of electrochemical swing and pressure swing. In the case of the electrochemical swing or the combination of electrochemical swing and pressure swing, electrodes may be incorporated into or onto opposing faces of selected walls 210 of the plurality of channels 202.

The cyclic sorption and desorption process embodiments described above may be used at low feed pressure from atmospheric pressure to high pressures of hundreds of atmospheres (atm). Higher pressures require stronger sorbent structures and multi-channel monolith structures as described above. The process embodiments described above may be used at operating temperatures of approximately 25 degrees Celsius (° C.) to 1000° C.

As noted above, the arrangement and number of the feed channels 204, sorbent channels 206, exit channels 208 and heat transfer channels 302 will vary depending on the process requirements and design requirements. A few of the many possible configurations were provided above. Other possible configurations for the multi-channel monolith 106 within the context of the feed channels 204, sorbent channels 206, exit channels 208 and heat transfer channels 302 as illustrated in FIGS. 2-5 are described below.

In one embodiment, the multi-channel monolith 106 may comprise a square channel monolithic honeycomb. Separation may be achieved via cross flow (e.g., lateral flow) between two adjacent columns of channels where a pre-coating may be applied to opposite walls 210 of each channel to render those walls 210 blocked to lateral flow between channels of the multi-channel monolith 106. For example, with each row of channels 202 adjacent to one another, the pre-coating prevents lateral flow between rows. That is, lateral flow would only occur within a single row. In another embodiment, the multi-channel monolith may seal edges adjoining feed and exit channels.

Although additional configurations of the multi-channel monolith 106 are described above, it should be noted that other configurations of the feed channels 204, the sorbent channels 206, the exit channels 208 and the heat transfer channels 302 may be possible. The configurations described herein of the multi-channel monolith 106 should not be considered limiting.

Figure 6:
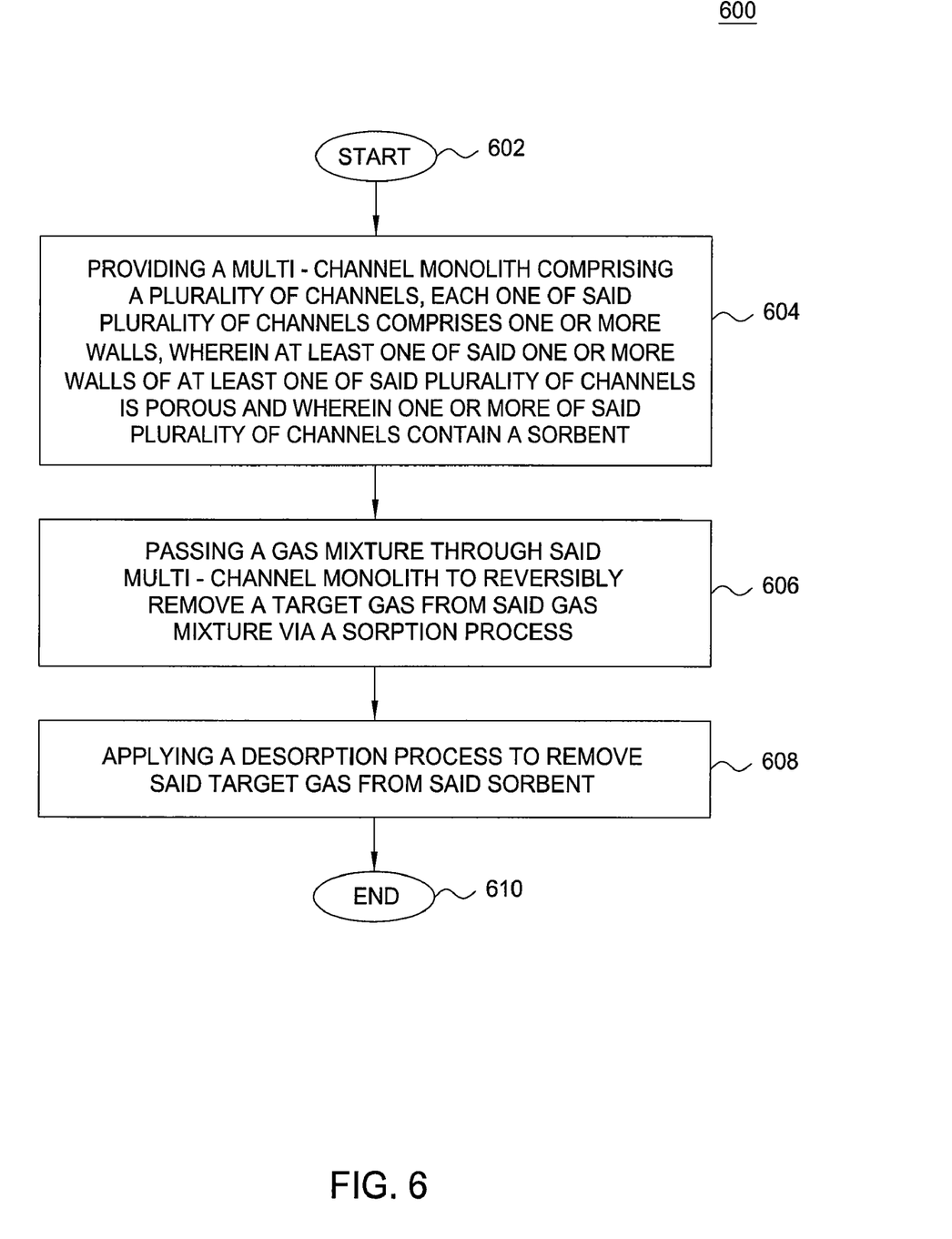
FIG. 6 depicts a flow diagram of one embodiment of a method for gas removal.

FIG. 6 illustrates one embodiment of a flow diagram for a method 600 of reversibly sorbing a target gas. The method may be carried out for example via a multi-channel monolith 106 in any one of the configurations described above. The method 600 begins at step 602. At step 604, the method 600 provides a multi-channel monolith comprising a plurality of channels, each one of said plurality of channels comprises one or more walls, wherein at least one of said one or more walls of at least one of said plurality of channels is porous and wherein one or more of said plurality of channels contain a sorbent.

At step 604, the method 600 passes a gas mixture through the multi-channel monolith 106 to reversibly remove a target gas from said gas mixture via a sorption process. For example, $CO_2$ gas may be captured using the above process. However, it should be noted that the methods and apparatuses disclosed herein may apply to removal and/or capture of other gases as well.

At step 608, the method 600 applies a desorption process to remove said target gas from said sorbent. For example, any one of the cyclic sorption and desorption processes described above may be used, such as for example, pressure swing, temperature swing, electrochemical swing or any combination thereof.

In one embodiment, steps 604, 606 and 608 may be repeated in a second train in tandem, offset in time from the first train, to maintain continuous feed and separation of the target gas. In other words, the steps 604, 606 and 608 may be performed twice in tandem and offset in time. In another embodiment, steps 604, 606 and 608 may be repeated until a desired amount of the target gas is removed from the gas mixture.

For example, the desired amount of the target gas to be removed may be a function of a particular implementation or be process specific. In other words, some processes may require that 90% of the target gas be removed from the gas mixture. Another process may be less stringent and require 50% of the target gas be removed from the gas mixture. It should be noted that the desired amount may be any amount as required by a particular implementation or process requirements. The method ends at step 610.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus for reversibly sorbing a target gas, comprising:
an inlet;
a multi-channel monolith coupled to said inlet, wherein said multi-channel monolith is extruded as a single piece and comprises a plurality of channels, each one of said plurality of channels comprises one or more walls, wherein at least one of said one or more walls of at least one of said plurality of channels is porous and wherein one or more of said plurality of channels contain a sorbent, wherein said one or more of said plurality of channels containing said sorbent is capped on both ends; and
an outlet coupled to said multi-channel monolith.

2. The apparatus of claim 1, wherein said multi-channel monolith comprises at least one of: a ceramic, an inorganic metallic material, an organic material or glass.

3. The apparatus of claim 1, wherein said sorbent comprises at least one of: a porous solid, a porous gel or a porous material to which a sorbing material has been applied.

4. The apparatus of claim 3, wherein said porous solid, said porous gel or said porous material is made of said sorbent.

5. The apparatus of claim 1, wherein said sorbent comprises at least one of: a solid amine, a carbon, a carbon composite, a zeolite, an aerogel, a zinc based material, a copper based material, a zirconate or a carbonate.

6. The apparatus of claim 1, wherein said sorbent fills a volume of said one or more of said plurality of channels containing said sorbent.

7. The apparatus of claim 1, wherein said sorbent is deposited on said one or more walls of said one or more of said plurality of channels containing said sorbent.

8. The apparatus of claim 1, wherein each one of said plurality of channels is contiguously attached to one another.

9. The apparatus of claim 1, wherein one or more of said plurality of channels are feed channels, wherein said feed channels are capped on one end and one or more of said plurality of channels are exit channels, wherein said exit channels are capped on an opposite end relative to said feed channels.

10. The apparatus of claim 1, wherein a subset of said plurality of channels has a first width and a remaining set of said plurality of channels has a second width.

11. The apparatus of claim 1, wherein said plurality of channels all have a common width.

12. The apparatus of claim 1, wherein one or more of said plurality of channels contain a heat transfer medium.

13. The apparatus of claim 1, wherein at least one of said one or more walls of at least one of said plurality of channels are coated such that they are not porous.

14. The apparatus of claim 1, wherein a cyclic sorption process and a cyclic desorption process is applied to the multi-channel monolith to reversibly bind and unbind target gas to and from said sorbent.

15. The apparatus of claim 14, wherein said cyclic sorption process and said cyclic desorption process comprises at least one of: a pressure swing process, a temperature swing process, an electrochemical swing process, a combination of said pressure swing process and said temperature swing process or a combination of said electrochemical swing process and said pressure swing process.

16. The apparatus of claim 15, wherein said pressure swing process comprises a rapid cycle pressure swing adsorption.

17. A method for reversibly sorbing a target gas, comprising:
providing a multi-channel monolith comprising a plurality of channels, wherein said multi-channel monolith is extruded as a single piece, each one of said plurality of channels comprises one or more walls, wherein at least one of said one or more walls of at least one of said plurality of channels is porous and wherein one or more of said plurality of channels contain a sorbent, wherein said one or more of said plurality of channels containing said sorbent is capped on both ends;
passing a gas mixture through said multi-channel monolith to reversibly remove a target gas from said gas mixture via a sorption process; and
applying a desorption process to remove said target gas from said sorbent.

18. The method of claim 17, wherein said sorption process and said desorption process are cyclical.

19. The method of claim 17, wherein said sorption process and said desorption process comprises at least one of: a pressure swing process, a temperature swing process, an electrochemical swing process, a combination of said pressure swing process and said temperature swing process or a combination of said electrochemical swing process and said pressure swing process.

20. The method of claim 19, wherein said pressure swing process comprises a rapid cycle pressure swing adsorption.

21. The method of claim 17, wherein said providing, said passing and said applying are performed twice in tandem and offset in time to maintain a continuous feed and separation of said target gas.

22. The method of claim 17, wherein said providing, said passing and said applying are repeated until a desired amount of said target gas is removed from said gas mixture.

23. The method of claim 17, wherein said multi-channel monolith comprises at least one of: a ceramic, an inorganic metallic material, an organic material or glass.

24. The method of claim 17, wherein said sorbent comprises at least one of: a porous solid, a porous gel or a porous material to which a sorbing material has been applied.

25. The method of claim 24, wherein said porous solid, said porous gel or said porous material is made of said sorbent.

26. The method of claim 17, wherein said sorbent comprises at least one of: a solid amine, a carbon, a carbon composite, a zeolite, an aerogel, a zinc based material, a copper based material, a zirconate or a carbonate.

27. The method of claim 17, wherein said sorbent fills a volume of said one or more of said plurality of channels containing said sorbent.

28. The method of claim 17, wherein said sorbent is deposited on said one or more walls of said one or more of said plurality of channels containing said sorbent.

29. The method of claim 17, wherein each one of said plurality of channels is contiguously attached to one another.

30. The method of claim 17, wherein said passing said gas mixture through said multi-channel monolith to reversibly remove said target gas from said gas mixture comprises:
feeding said gas mixture through one or more feed channels of said multi-channel monolith, wherein said feed channels are capped on one end; and
removing said gas mixture less said target gas through one or more exit channels, wherein said exit channels are capped on an opposite end relative to said feed channels.

31. The method of claim 17, wherein a subset of said plurality of channels has a first width and a remaining set of said plurality of channels has a second width.

32. The method of claim 17, further comprising:
coating said porous wall of one or more of said plurality of channels.

33. An apparatus for reversibly sorbing a target gas, comprising:
an inlet;
a multi-channel monolith coupled to said inlet, said multi-channel monolith comprising a plurality of channels, wherein each one of said plurality of channels comprises one or more walls and wherein all of said plurality of channels contain a sorbent, wherein all of said plurality of channels are open on each end of each one of said plurality of channels, wherein one or more of said one or more walls of said plurality of channels are coated such that said one or more of said one or more walls have no porosity, and wherein at least one of said one or more walls of at least one of said plurality of channels is porous; and
an outlet coupled to said multi-channel monolith.

34. The apparatus of claim 33, wherein a cyclic sorption and desorption process is applied to the multi-channel monolith to reversibly bind and unbind said target gas to and from said sorbent.

35. The apparatus of claim 34, wherein said cyclic sorption and desorption process comprises at least one of: a pressure swing process, a temperature swing process, an electrochemical swing process, a combination of said pressure swing process and said temperature swing process or a combination of said electrochemical swing process and said pressure swing process.

36. The apparatus of claim 35, wherein said pressure swing process comprises a rapid cycle pressure swing adsorption or absorption.

* * * * *